(12) United States Patent
Kuwabara et al.

(10) Patent No.: US 8,385,598 B2
(45) Date of Patent: Feb. 26, 2013

(54) ACTION ANALYSIS APPARATUS

(75) Inventors: Takahiko Kuwabara, Kanagawa (JP); Hitoshi Ikeda, Kanagawa (JP); Noriji Kato, Kanagawa (JP); Mihoko Watanabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/344,865

(22) Filed: Jan. 6, 2012

(65) Prior Publication Data

US 2012/0106838 A1 May 3, 2012

Related U.S. Application Data

(62) Division of application No. 11/330,150, filed on Jan. 12, 2006, now Pat. No. 8,116,517.

(30) Foreign Application Priority Data

Jun. 14, 2005 (JP) ................................. 2005-174411

(51) Int. Cl.
- *G06K 9/00* (2006.01)
- *G06K 9/46* (2006.01)
- *G06K 9/62* (2006.01)
- *G05B 13/02* (2006.01)
- *H04N 7/14* (2006.01)

(52) U.S. Cl. .......... 382/103; 700/29; 348/14.1; 345/647

(58) Field of Classification Search .................. 382/103, 382/190, 225; 700/29; 348/14.1; 345/647
See application file for complete search history.

(56) References Cited

U.S. PATENT DOCUMENTS

| | | | | |
|---|---|---|---|---|
| 6,363,160 B1 * | 3/2002 | Bradski et al. | ................. | 382/103 |
| 7,715,598 B2 * | 5/2010 | Li et al. | ......................... | 382/118 |
| 8,098,273 B2 * | 1/2012 | Khouri et al. | ................ | 348/14.1 |
| 8,210,848 B1 * | 7/2012 | Beck et al. | ..................... | 434/112 |
| 8,219,438 B1 * | 7/2012 | Moon et al. | .................. | 705/7.29 |
| 8,254,691 B2 * | 8/2012 | Kaneda et al. | .................. | 382/195 |
| 2005/0265453 A1 * | 12/2005 | Saito | ........................ | 375/240.16 |
| 2005/0285943 A1 * | 12/2005 | Cutler | ........................ | 348/207.1 |

FOREIGN PATENT DOCUMENTS

| | | |
|---|---|---|
| JP | A-08-320920 | 12/1996 |
| JP | A-10-228295 | 8/1998 |
| JP | A-2002-006874 | 1/2002 |
| JP | A-2002-077592 | 3/2002 |
| JP | A-2003-085572 | 3/2003 |
| JP | A-2004-248312 | 9/2004 |

OTHER PUBLICATIONS

Oct. 12, 2010 Office Action issued in Japanese Patent Application No. 2005-174411.

\* cited by examiner

*Primary Examiner* — Kathleen Y Dulaney
(74) *Attorney, Agent, or Firm* — Oliff & Berridge, PLC

(57) ABSTRACT

An action analysis apparatus includes an acquiring unit that acquires moving image data including a series of frame image data obtained by imaging a human body and environmental information in a period when the moving image data is imaged, a unit that detects at least one image area in which a predetermined portion of the imaged human body is imaged in the frame image data and generates and stores information to identify the detected image area, a unit that (i) generates feature quantity information, (ii) generates information to identify frames of the moving image data imaged at a timing at which the feature quantity information satisfies a predetermined condition, (iii) obtains a length of continuous timings at which a length of the feature quantity information exceeds the predetermined condition based on to generated information, and (iv) stores the information.

7 Claims, 9 Drawing Sheets

FIG. 3

| FRAME NUMBER |
|:---:|
| 5 |
| 6 |
| 7 |
| ⋮ |

| PICKUP R1 | MOVEMENT R3 | PLACE R2 |
|---|---|---|
| 60 | 10 | 5 |
| 20 | 20 | 7 |
| ⋮ | ⋮ | ⋮ |

FIG. 9

| NAME | DATE DATE/MONTH/YEAR | PICKUP R1 (SECOND) | MOVEMENT R2 (SECOND) | PLACE R3 (SECOND) | SPEED (cm/SECOND) | HAND POSITION INFORMATION |
|---|---|---|---|---|---|---|
| A | XX YY, ZZ | 7 | 20 | 4 | 0.50 | (10, 20), (20, 30), ... |
|   | XX YY, ZZ | 8 | 18 | 4 | 0.56 | (10, 21), (21, 31), ... |
|   | ... | ... | ... | ... | ... | ... |
| B | XX YY, ZZ | 15 | 22 | 3 | 0.45 | (11, 22), (31, 21), ... |
|   | ... | ... | ... | ... | ... | ... |

N — NAME; D — DATE; E — (PICKUP, MOVEMENT, PLACE); R — HAND POSITION

ACTION ANALYSIS APPARATUS

This is a Division of U.S. application Ser. No. 11/330,150 filed Jan. 12, 2006. The disclosure of the prior application is hereby incorporated by reference herein in its entirety.

BACKGROUND OF THE INVENTION

1. Field of the Invention

The present invention relates to an action analysis apparatus for outputting information about an action or a posture of a target object such as a person.

2. Description of the Related Art

As an apparatus for discriminating a posture of a person who is a photographic subject from image data imaged, an apparatus etc. using a relative positional relation between parts of body such as a hand and a shoulder have been developed conventionally (for example, JP-A-8-320920). Such an apparatus is used, for example, in the case of checking an effect of rehabilitation of an imaged person in the field of rehabilitation.

However, in the case of checking an action of a person, for example, during training of rehabilitation, the person must be imaged over the whole training, its imaging time of several minutes or longer is often taken. On the other hand, the side of a person in charge of an action check, for example, medical personnel related to rehabilitation needs to check the whole image imaged in the rehabilitation, and it takes a long time to make the check in the present state of affairs.

The invention has been implemented in view of the actual circumstances described above, and one object of the invention is to provide an action analysis apparatus capable of reducing a burden of a person in charge of an action check and improving working efficiency.

SUMMARY OF THE INVENTION

According to an aspect of the present invention, an action analysis apparatus includes an acquiring unit that acquires moving image data including a series of frame image data obtained by imaging a human body, a unit that detects at least one image area in which a predetermined portion of the imaged human body is imaged in the frame image data included in the acquired moving image data and generates and stores information to identify the detected image area, and a unit that generates at least one of feature quantity information about the predetermined portion of the human body detected in every frame image data and generates and stores information to identify frame image data at a timing at which the feature quantity information satisfies a predetermined condition as feature time point information. The feature time point information is applied to present the moving image data to a user.

According to another aspect of the present invention, an action analysis apparatus includes an acquiring unit that acquires moving image data including a series of frame image data obtained by imaging a human body and environmental information in a period when the moving image data is imaged, a unit that detects at least one image area in which a predetermined portion of the imaged human body is imaged in the frame image data included in the acquired moving image data and generates and stores information to identify the detected image area, and a unit that generates at least one of feature quantity information in the environmental information and generates and stores information to identify frame image data of the moving image data imaged at a timing at which the feature quantity information satisfies a predetermined condition as feature time point information. The feature time point information is applied to present the moving image data to a user.

Here, the environmental information may be sound information recorded in the period when the moving image data is imaged.

Also, frame image data of a predetermined time range including the frame image data identified by the feature time point information may be highlighted and presented in processing for presenting the moving image data to a user.

According to yet another aspect of the present invention, an action analysis method using a computer includes a step of acquiring moving image data including a series of frame image data obtained by imaging a human body, a step of detecting at least one image area in which a predetermined portion of the imaged human body is imaged in the frame image data included in the acquired moving image data and generating and storing information to identify the detected image area, and a step of generating at least one of feature quantity information about the predetermined portion of the human body detected in every frame image data and generating and storing information to identify frame image data at a timing at which the feature quantity information satisfies a predetermined condition as feature time point information. The feature time point information is applied to present the moving image data to a user.

According to still another aspect of the present invention, an action analysis method using a computer includes a step of acquiring moving image data including a series of frame image data obtained by imaging a human body and environmental information in the period when the moving image data is imaged, a step of detecting at least one image area in which a predetermined portion of the imaged human body is imaged in the frame image data included in the acquired moving image data and generating and storing information to identify the detected image area, and a step of generating at least one of feature quantity information in the environmental information and generating and storing information to identify frame image data of the moving image data imaged at a timing at which the feature quantity information satisfies a predetermined condition as feature time point information. The feature time point information is applied to present the moving image data to a user.

According to yet another aspect of the present invention, a storage medium readable by a computer, the storage medium storing a program of instructions executable by the computer to perform a function for analyzing an action, the function includes the steps of acquiring moving image data including a series of frame image data obtained by imaging a human body, detecting at least one image area in which a predetermined portion of the imaged human body is imaged in the frame image data included in the acquired moving image data and generating and storing information to identify the detected image area, and generating at least one of feature quantity information about the predetermined portion of the human body detected in every frame image data and generating and storing information to identify frame image data at a timing at which the feature quantity information satisfies a predetermined condition as feature time point information. The feature time point information is applied to present the moving image data to a user.

According to still another aspect of the present invention, a storage medium readable by a computer, the storage medium storing a program of instructions executable by the computer to perform a function for analyzing an action, the function includes the steps of acquiring moving image data including a series of frame image data obtained by imaging a human body and environmental information in the period when the moving image data is imaged, detecting at least one image area in which a predetermined portion of the imaged human body is imaged in the frame image data included in the acquired moving image data and generating and storing information to identify the detected image area, and generating at least one of feature quantity information in the environmental information and generating and storing information to identify frame image data of the moving image data imaged at a timing at which the feature quantity information satisfies a predetermined condition as feature time point information. The feature time point information is applied to present the moving image data to a user.

BRIEF DESCRIPTION OF THE DRAWINGS

FIG. 3 is an explanatory diagram showing an example of feature time point information generated by the action analysis apparatus according to the embodiment of the invention;

FIG. 9 is an explanatory diagram showing an example of an analysis result of action information in the action analysis apparatus according to the embodiment of the invention.

DETAILED DESCRIPTION OF THE INVENTION

[Example of Basic Action]

Figure 1:
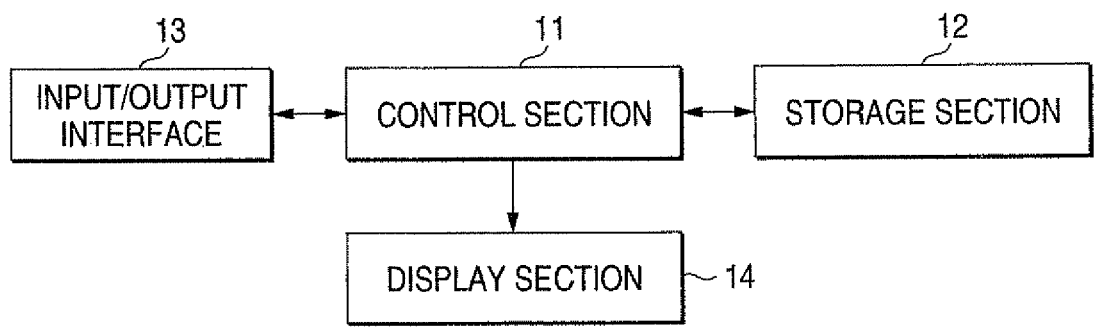
FIG. 1 is a configuration block diagram of an action analysis apparatus according to an embodiment of the invention.

An embodiment of the invention will be described with reference to the drawings. An action analysis apparatus according to the embodiment of the invention is an apparatus for recognizing a position of a predetermined portion of the human body from moving image data inputted from the outside. Here, it is assumed that positions of a "face" and a "hand" are recognized as the predetermined portion. Incidentally, instead of the "hand", the case of a target of recognition of a "toe" is similar. The action analysis apparatus according to the embodiment is specifically configured to include a control section 11, a storage section 12, an input-output interface 13 and a display section 14 as shown in FIG. 1. Here, moving image data is acquired from a video reproducing device or an imaging part (such as a CCD camera) (not shown) connected to the input-output interface 13. This moving image data is formed by including frame image data which is a series of static images obtained by imaging a person. A frame number indicating order imaged is associated with each of the frame image data.

The control section 11 operates according to a program stored in the storage section 12, and basically performs processing for identifying an image of a face portion (face identification processing), processing for identifying an image of a hand portion (hand identification processing) and action discrimination processing for discriminating an action of a person of a photographic subject based on information about a relative position of the face and the hand identified by these processing with respect to each of the series of static images included in moving image data acquired from the outside. The specific contents of these processing will be described later.

The storage section 12 is a computer-readable record medium for storing programs executed by the control section 11. Also, this storage section 12 operates as work memory for storing various data required in a process of the processing of the control section 11.

As shown in FIG. 1, the input-output interface 13 is connected to an external device such as a camera device, and acquires image data from the external device and outputs the image data to the control section 11. Also, this input-output interface 13 outputs various data to the external device according to instructions inputted from the control section 11. The display section 14 is, for example, a display, and displays information according to instructions inputted from the control section 11.

Figure 2:
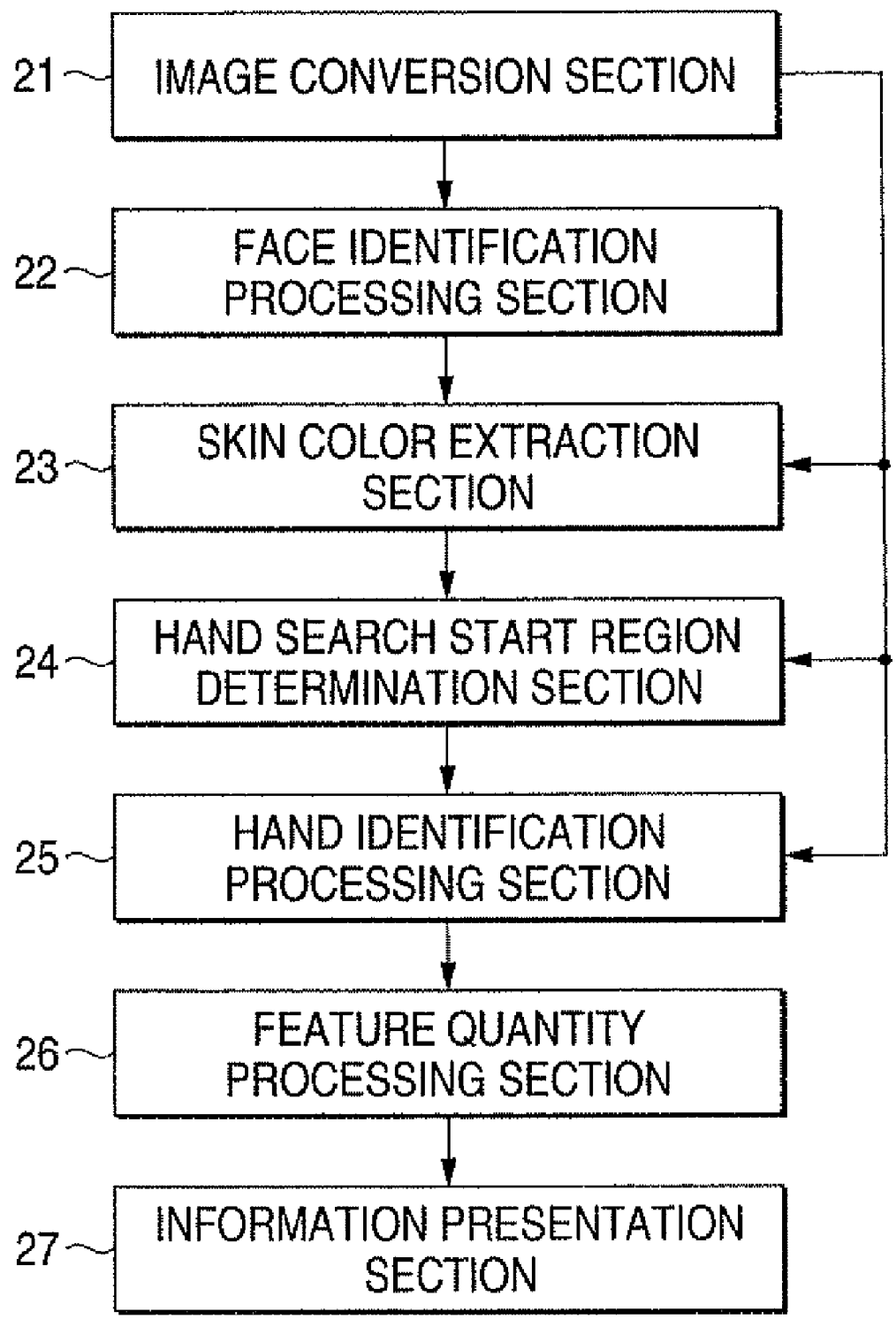
FIG. 2 is a functional block diagram of the action analysis apparatus according to the embodiment of the invention.

Programs executed by the control section 11 are functionally configured to include an image conversion section 21, a face identification processing section 22, a skin color extraction section 23, a hand search start region determination section 24, a hand identification processing section 25, a feature quantity processing section 26 and an information presentation section 27 as shown in FIG. 2.

The image conversion section 21 converts frame image data acquired through the input-output interface 13 and targeted for processing into image data of a gray scale (gray scale data), and outputs the gray scale data to the face identification processing section 22. Also, this image conversion section 21 converts the frame image data targeted for processing into image data of a hue image (hue data), and outputs the hue image data to the skin color extraction section 23, the hand search start region determination section 24 and the hand identification processing section 25.

The face identification processing section 22 performs processing for identifying a face portion from the gray scale data inputted from the image conversion section 21. This face identification processing section 22 could recognize a face portion in image data based on data previously acquired by learning as described later. Also, this face identification processing section 22 may be means capable of identifying a size or a direction (three-dimensional direction) of a face as well as a position of the face.

This face identification processing section 22 could be means for extracting a portion corresponding to a face of a person from among the gray scale data using a first learning database obtained by learning processing of the face of the person with respect to data in which, for example, frame image data included in moving image data is converted into the gray scale data. In this case, it may be constructed so as to decide whether or not data of an image after normalization is an image of a face using information inside the first learning database by making conversion (normalization) so that an image of a face portion makes close contact with a normalized image using a second learning database in which after a face portion is identified by a predetermined method, an image (normalized image) of an erect face oriented to the front and plural face images in which the face is respectively rotated by a predetermined angle in the right and left directions from the normalized image are previously prepared and learning processing of these images is performed. According to this an angle of rotation can be determined in a process of processing of normalization, so that it can speedily be determined whether or not the image is the face by the processing of normalization and also by outputting the angle of rotation obtained in the process, it can be supplied to the processing using the direction of the face as described above. This face identification processing section 22 stores information indicating a position, a size, a direction, etc. of the identified face in the storage section 12 as face position information.

The skin color extraction section 23 fetches a partial image of an area corresponding to the face portion identified by the face identification processing section 22 among the hue data inputted from the image conversion section 21, and computes and outputs the average hue data of the partial image. Specifically, a histogram of pixel values in the hue data included in an area delimited by area information outputted by the face identification processing section 22 is outputted as skin color information. This skin color information is a histogram of a color (that is, a skin color of the face) of the face identified by the face identification processing section 22 and is, so to speak, information about skin color peculiar to the person. The apparatus of the embodiment extracts a skin color peculiar to this target and identifies a hand portion using its skin color. Incidentally, the reason why comparison is made by the hue herein is because the case that lightness of skin colors of a face and a hand has changed due to, for example, sunburn is considered.

The hand search start region determination section 24 and the hand identification processing section 25 detect a portion in which a hand is imaged from each of the frame image data. Here, first, the hand search start region determination section 24 temporarily identifies a candidate portion (search start area) in which a hand is imaged in each of the frame image data and then, using a cam shift algorithm (Gary R. Bradski, Computer Vision Face Tracking For Use in a Perceptual User Interface: Intel Technology Journal Q2, 1998), the hand identification processing section 25 starts search processing using the identified search start area as an initial point and identifies an area in which the hand is imaged. Incidentally, an example using a cam shift method is described herein, but it is not limited to this method.

The hand search start region determination section 24 generates likelihood values indicating probability (likelihood) of a skin color based on a histogram of skin color information with respect to each of the pixels on the hue data inputted from the image conversion section 21, and arranges these likelihood values in a manner similar to each of the pixels of the hue data, and generates a likelihood map. In the likelihood value, for example, a value in which a value of a histogram corresponding to hues of pixels targeted for computation is divided by the sum total of the values of the histogram may be used and in addition, publicly known methods called a correlation method or a back projection method may be used. Incidentally, the likelihood map is used herein, but it is not limited to this, and using frequency values of a histogram, point (score) values may be generate to use a map of the score values.

In this case, likelihood is set at "0" in an area corresponding to a face portion. As a result of this, a situation in which the face portion is falsely detected as a hand portion can be prevented surely.

The hand search start region determination section 24 further scans the likelihood map in a rectangular area of a predetermined size and defines at least one scanning position in decreasing order of the sum value of likelihood values inside the rectangular area. Then, a rectangular area in the scanning position is defined as a search start area. Here, when the number of targets (hands in this case) imaged is previously known, search start areas of the number corresponding to the number of targets may be defined.

The hand identification processing section 25 performs the following processing using each of the search start areas decided by the hand search start region determination section 24 on the hue data inputted from the image conversion section 21 as an initial position of a search area.

That is, the hand identification processing section 25 obtains moment of a likelihood value included in the search area among the hue data using a value indicated by skin color information outputted by the skin color extraction section 23 and a pixel value (hue value) of each of the pixels inside the search area with respect to each of the search areas in which the initial position is respectively defined based on each of the search start areas.

Then, the hand identification processing section 25 moves the search area based on the obtained moment. Here, the moment is, for example, moment shown by the following formulas.

$$m_{00} = \Sigma_i \Sigma_j h(i,j)$$

$$m_{10} = \Sigma_i \Sigma_j i \cdot h(i,j)$$

$$m_{01} = \Sigma_i \Sigma_j j \cdot h(i,j)$$

$$m_{20} = \Sigma_i \Sigma_j i^2 \cdot h(i,j)$$

$$m_{02} = \Sigma_i \Sigma_j j^2 \cdot h(i,j)$$

$$m_{11} = \Sigma_i \Sigma_j i \cdot j \cdot h(i,j)$$

Here, $h(i, j)$ represents a likelihood value in coordinates $(i, j)$ of the likelihood map.

The hand identification processing section 25 defines the center of gravity by the zero-order moment $m_{00}$ among the formulas, and moves the search area in a position centered on the center of gravity. Also, a size of the search area or the amount of rotation is decided by the first-order or second-order moment and the search area is updated.

Subsequently, the hand identification processing section 25 repeats this update processing until the amount of movement is less than a predetermined threshold value even when the search area is updated or the number of updates reaches a predetermined number (a convergence condition is satisfied). Then, the search area at the time when the convergence condition is satisfied is regarded as an area in which a hand is imaged, and information (for example, a set of vertex coordinates of a polygon surrounding an outer shape of the area) for delimiting the area is stored in the storage section 12 as hand position information.

Thus, in each of the frame image data, recognition processing of a face is first performed and based on information about color of the recognized face, using an area with a high possibility that a hand will exist as an initial position, the area is moved, scaled or rotated by a method such as a cam shift method and an area in which the hand is included is delimited.

The feature quantity processing section 26 generates information about an action of an imaged person based on a movement state on moving image data of an image area including a predetermined portion (face or hand) of the human body detected in each of the frame image data. For example, this feature quantity processing section 26 generates at least one feature quantity information based on a series of hand position information stored in the storage section 12, and outputs a frame number (information for identifying the frame image data) of the frame image data corresponding to timing at which the feature quantity information satisfies a predetermined condition. Here, the feature quantity information may be, for example, the hand position information itself. Then, when the hand position information used as this feature quantity information does not vary over a predetermined period (a predetermined number of frame image data), a frame number of the frame image data corresponding to the period for which the information does not vary is outputted.

That is, the feature quantity processing section 26 computes a difference between the hand position information in the next frame image data with respect to, for example, each of the frame image data. Specifically, a size of a difference between hand position information corresponding to the ith frame image data and hand position information corresponding to the (i+1)th frame image data is computed. Then, a frame number of the frame image data in which this difference is less than a predetermined movement amount threshold value is selected and a progression formed from the selected frame numbers is generated. Further, the feature quantity processing section 26 detects a portion in which the frame numbers are continuous from the generated progression, and obtains a length of a frame number sequence of the detected portion. Processing for detecting the portion in which the numbers are continuous from the progression and processing for obtaining the length of the detected partial progression are well known, so that detailed description herein is omitted.

Figure 3:
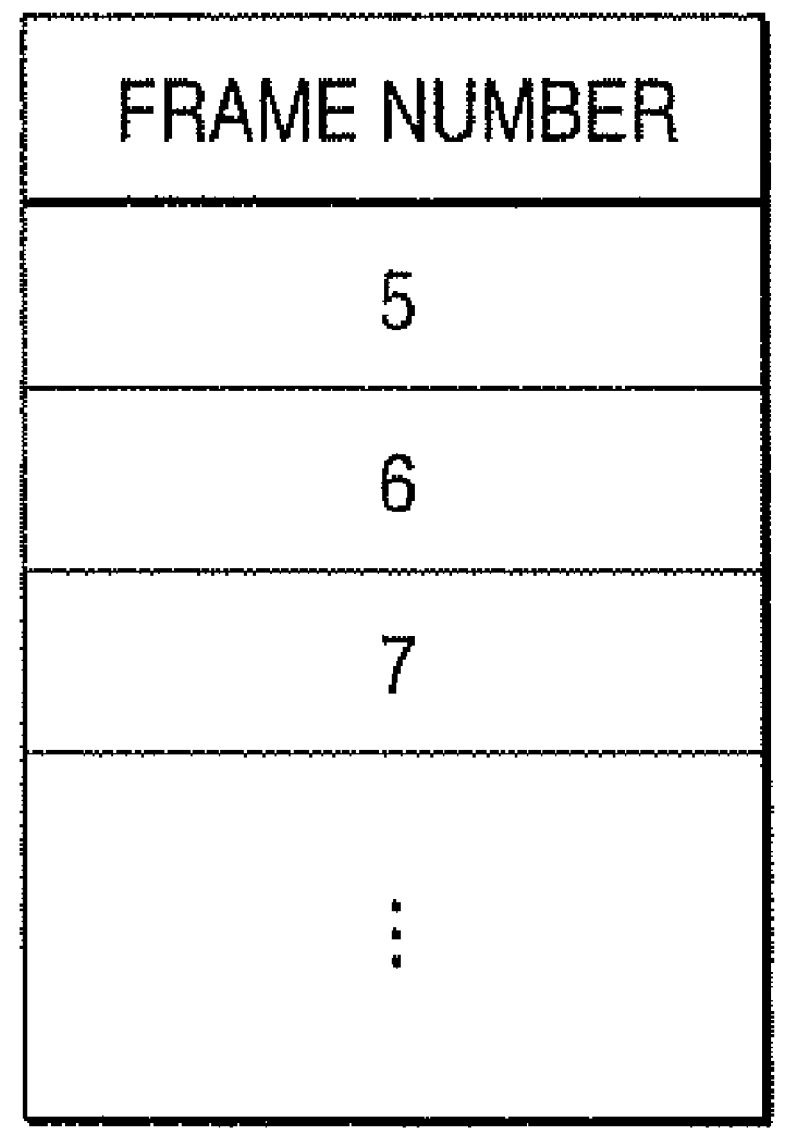

The feature quantity processing section 26 checks whether or not there is a portion in which the length exceeds a predetermined threshold value of a predetermined period among the portions in which the frame numbers are continuous, and when there is such a portion, for example, the first frame number and the last frame number of the portion are stored in the storage section 12 as feature time point information for identifying the portion. This feature time point information results in data listing the frame numbers accordingly (FIG. 3).

Figure 4:
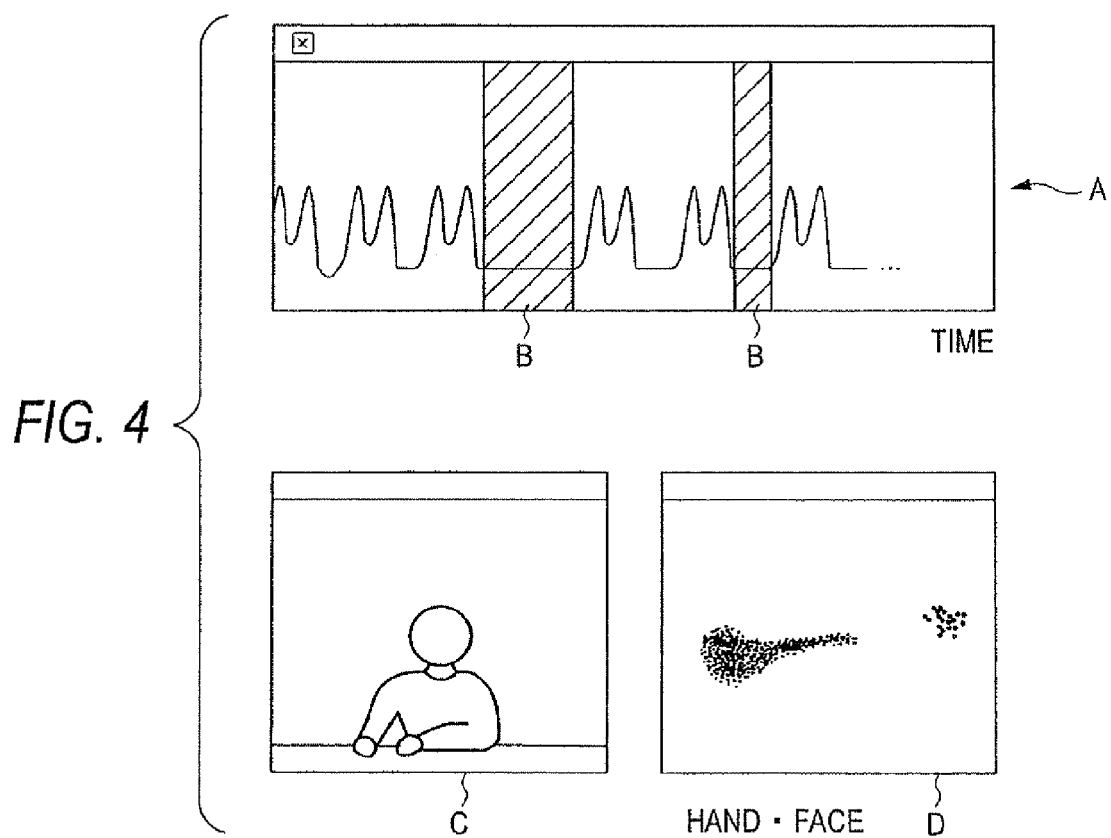
FIG. 4 is an explanatory diagram showing a screen example displayed by the action analysis apparatus according to the embodiment of the invention.

The information presentation section 27 displays and outputs the face position information or the hand position information stored in the storage section 12 to the display section 14 according to an instruction operation of a user. Also, this information presentation section 27 controls a display form of the face position information or the hand position information using the feature time point information stored in the storage section 12. For example, this information presentation section 27 shows time variations in coordinate values (values for one axis of the coordinate values in this case) of a hand on frame image data included in the hand position information as a graph as shown in FIG. 4 (A). Also, a time range corresponding to a frame number shown by the feature time point information inside this graph is highlighted by, for example, changing a background color of the graph (B).

Further, the information presentation section 27 displays moving image data imaged (C) and also reproduces the moving image data from a position corresponding to a frame number specified on the graph (A). As a result of this, a user can instruct reproduction of a moving image corresponding to a highlighted portion, and can selectively reproduce and browse a moving image of a portion in which a feature action is performed on an action of a person imaged. Further, the information presentation section 27 may create an image in which each of the coordinates of the hand position information or the face position information is plotted as points (D). Incidentally, legends capable of mutual discrimination are used as a hand and a face.

According to the embodiment thus, without referring to all of the moving image data, a moving image of a portion in which a feature action is performed can be selectively reproduced and browsed and a burden of a person in charge of an action check can be reduced to improve working efficiency.

[Use of Sound]

Also, the control section 11 of the embodiment may acquire sound data acquired and recorded by a microphone etc. during the period when moving image data targeted for processing is imaged together with the moving image data and use a feature quantity based on the sound data as a feature quantity in the feature quantity processing section 26. That is, in the sound data of this case, an interval of the sound data acquired at the time of imaging the frame image data is mutually associated with each of the frame image data so that the sound data can be reproduced in synchronization with the moving image data.

The feature quantity processing section 26 detects a portion in which intensity of sound (volume of the recorded sound) among the recorded sound data exceeds a predetermined threshold value. Then, a frame number of the frame image data corresponding to the detected portion is acquired and the frame number is stored in the storage section 12 as feature time point information.

Subsequently, the information presentation section 27 highlights a moving image portion of a predetermined number of frames before and after the frame image data identified by the frame number of this feature time point information, and presents the moving image portion to a user.

According to this example, the user can browse an image at the time when an imaged person has raised the voice, and without referring to all of the moving image data, a moving image of a portion in which a feature action is performed (for example, a point in time when a situation of the imaged person changes) can be selectively reproduced and browsed and a burden of a person in charge of an action check can be reduced to improve working efficiency.

[Use of Expression]

Further, the control section 11 may perform processing for detecting expression of a person from an image of the inside of a face image area identified by face identification processing in each of the frame image data and generate feature time point information using a feature quantity based on information about the expression. Here, the expression can be detected by processing for individually detecting eyebrows, eyes, a mouth, etc. from the image of the inside of the face image area and detecting inclination etc. of a range in which these are imaged. Such an expression detection method is not particularly limited herein, and various methods generally studied can be used (for example, M. J. Black and Y. Yacoob, "Recognizing Facial Expressions in Image Sequences Using Local Parameterized Models of Image Motion", Int'l J. Computer Vision, vol. 25, No. 1, pp. 23-48, 1997).

The feature quantity processing section 26 stores a frame number of frame image data detected that the frame image data has expression satisfying a predetermined particular condition based on information for identifying expression defined every frame image data in the storage section 12 as feature time point information. Then, the information presentation section 27 highlights a moving image portion of a predetermined number of frames before and after the frame image data identified by the frame number of this feature time point information, and presents the moving image portion to a user. According to this, when a frame number of the case that, for example, "a wry face has been made" is acquired, without referring to all of the moving image data, a moving image of a portion in which a feature action is performed (a point in time when a situation of an imaged person changes, for example, the imaged person is in pain) can be selectively reproduced and browsed and a burden of a person in charge of an action check can be reduced to improve working efficiency.

Incidentally, the feature time point information generated based on the hand position information, the feature time point information generated based on the sound and further the feature time point information generated based on the information about expression may be used in combination.

Also, in the case of using plural feature time point information thus, at least a portion of frame numbers may be enumerated in the plural feature time point information. For example, a frame number of frame image data at a point in time when a position of a knee or a toe has stayed and a wry face has been made is enumerated in both of the feature time point information indicating the period when "a position of a knee or a toe has stayed" and the feature time point information indicating the period when "a wry face has been made". Therefore, with respect to a frame number enumerated in common with such plural feature time point information, an aspect of highlights may be changed depending on how pieces of feature time point information the frame number is included. For example, in the case of coloring and highlighting a range of a frame number on a graph, density of a color used in coloring is increased as the number of pieces of feature time point information including the frame number increases. As a result of this, a point in time to place more emphasis can be visually recognized, and a moving image of a portion in which a feature action is performed can be selectively reproduced and browsed and a burden of a person in charge of an action check can be reduced to improve working efficiency.

[Plural Moving Image Data]

In the heretofore description, the moving image data targeted for processing is one, but it may further be constructed so as to use plural moving image data synchronized and imaged at the same timing. Here, synchronization of the moving image data can be implemented by associating the same frame number with frame image data of each of the moving image data imaged at the same point in time. Since a method for creating such plural moving image data mutually synchronized is well known, detailed description herein is omitted.

In one of this example, two moving image data are generated using two cameras. That is, in the case of rehabilitation of gait training, a face portion is imaged by a first camera and first moving image data including the face portion is generated. Also, a leg portion is imaged by a second camera and second moving image data including the leg portion is generated.

Then, for example, the control section 11 identifies an area of a face from each of the frame image data of the first moving image data, and further detects expression, and generates expression information indicating the expression of a person in each of the frame image data. Also, a locus (for example, a locus of the center of a detection area of the face) of sway of a head in all directions is detected from the detection area of the face, and the locus of the sway and the expression information are associated with a frame number of each of the frame image data and are stored in the storage section 12. Also, the control section 11 detects a height of a toe, a height of a knee, a relative position between the toe and the knee, action speed of the toe and the knee, and stay time (time for which the toe or the knee stays in approximately the same place) from each of the frame image data of the second moving image data. Here, in a manner similar to detection of the hand position information, the toe can be detected from the second moving image data using skin color information obtained from the area of the face identified from each of the frame image data in the first moving image data. Also, when it is difficult to detect a position by the skin color information from the face area, for example, a skin is not exposed due to clothes etc. or an exposed portion is too large, a marker with a color different from skin color or colors of clothing material or background is attached to the toe or the knee of an imaged person and a position of the toe or the knee is identified by detecting the marker with the color from the second moving image data.

Then, the control section 11 performs processing of the feature quantity processing section 26, and stores a frame number corresponding to, for example, stay time of the toe or the knee in the storage section 12 as feature time point information. Also, a frame number of the period when expression of the face "has made a wry face" is acquired and is stored in the storage section 12 as feature time point information.

Then, as processing of the information presentation section 27, a moving image portion of a predetermined number of frames before and after the frame image data identified by these frame numbers of the feature time point information is highlighted and is presented to a user. According to this, without referring to all of the moving image data, a moving image of a portion of the period when "a position of the knee or the toe has stayed" or the period when "a wry face has been made", that is, a portion in which a feature action is performed can be selectively reproduced and browsed and a burden of a person in charge of an action check can be reduced to improve working efficiency.

Also in this case, plural feature time point information can be obtained, so that with respect to a frame number enumerated in common with such plural feature time point information, an aspect of highlights may be changed depending on how pieces of feature time point information the frame number is included.

[Size Correction Using Size of Face]

Further, when plural moving image data such as a face and a leg imaged from the same direction thus are targeted for processing, position information about a predetermined portion of the human body targeted for detection, for example, a height of a toe may be corrected using a size (size of an area detected so as to include the face) of the face detected from one moving image data. That is, using a size Ss of the face in predetermined frame image data as a reference size, a value in which a size S of the face in another frame image data is divided by this reference size is generated. Since this value becomes a value indicating a variation ratio of position information about a portion of the human body, the position information about the predetermined portion of the human body targeted for detection in another frame image data is multiplied by the value of S/Ss.

As a specific example, when a size of a face in frame image data (first frame image data) with a frame number of "1" is used as a reference size Ss and in the next frame image data, a size of the face is S and a height of a toe is ho, information about the height of the toe is corrected as the following formula.

$$h = ho \times (S/Ss)$$

As a result of this, even when the height of the toe varies depending on a distance between a camera and a person, the variations can be corrected.

[Handling of Plural Moving Image Data Including the Same Range]

Further, when a person is imaged using plural cameras as described herein, at least a portion of the plural cameras may image a common portion of the person. For example, the person may be imaged from the front by a first camera and the person may be imaged from the side by a second camera. In this case, some portion of a face or a hand can be imaged in common by both the cameras.

In the case of including a portion common to plural moving image data targeted for processing thus, for example, by imaging a hand portion from the front and the side, three-dimensional movement of the hand can be acquired.

Figure 5:
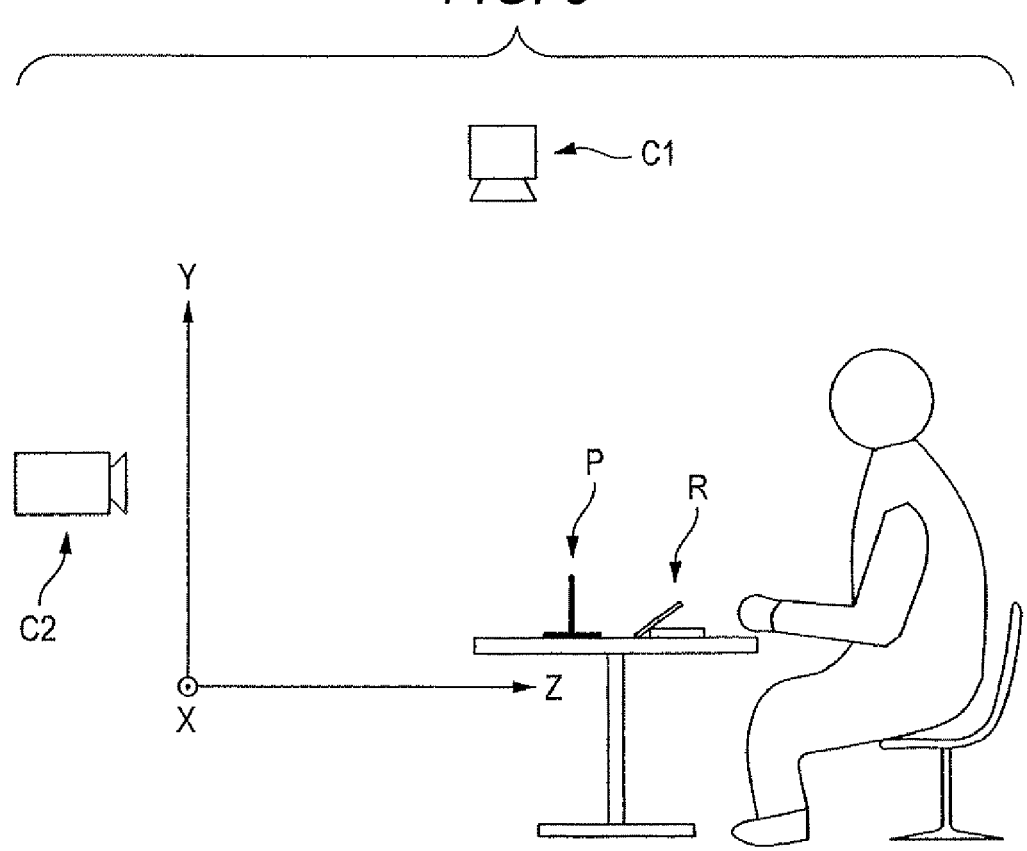
FIG. 5 is an explanatory diagram showing an example of arranging cameras at the time of imaging moving image data inputted to the action analysis apparatus according to the embodiment of the invention.

The control section 11 may perform processing for generating a movement locus of a hand as three-dimensional information. As one example, an example of undergoing rehabilitation in which a person targeted for imaging sits in the front of a desk and picks up a ring (R) from the desk and passes the ring through a quoit pole (P) on the desk is assumed as shown in FIG. 5. Also, here, it is assumed that a first camera C1 images the desk from the above and a second camera C2 images the person from the front. Therefore, both the first and second cameras C1, C2 image a hand of this person, but a face of the person is imaged by only the second camera C2.

The control section 11 acquires first moving image data and second moving image data respectively imaged by these first and second cameras C1, C2. Then, with respect to each of the moving image data, processing of the image conversion section 21 is performed and further, as processing of the face identification processing section 22, processing for identifying a face portion is performed from gray scale data of the second moving image data and face position information is acquired.

Also, as processing of the skin color extraction section 23, the control section 11 fetches a partial image of an area corresponding to the face portion identified by the face identification processing section 22 among hue data of the second moving image data inputted from the image conversion section 21, and computes and outputs the average hue data of the partial image.

The hand search start region determination section 24 and the hand identification processing section 25 of the control section 11 detect a portion in which a hand is imaged from each of the frame image data of the first and second moving image data. In this case, the hand search start region determination section 24 generates first and second likelihood maps corresponding to the first and second moving image data. In this case, the hand search start region determination section 24 generates the first likelihood map based on skin color information about the face portion acquired from the second moving image data using the first moving image data as a target of processing. Also, the second likelihood map is generated based on skin color information about the face portion acquired from the second moving image data using the second moving image data as a target of processing. Thus, the likelihood maps about all the moving image data can be generated using the skin color information acquired from some moving image data, and a hand can be detected from the moving images viewed from plural directions, and three-dimensional movement of the hand can be grasped.

Figure 6:
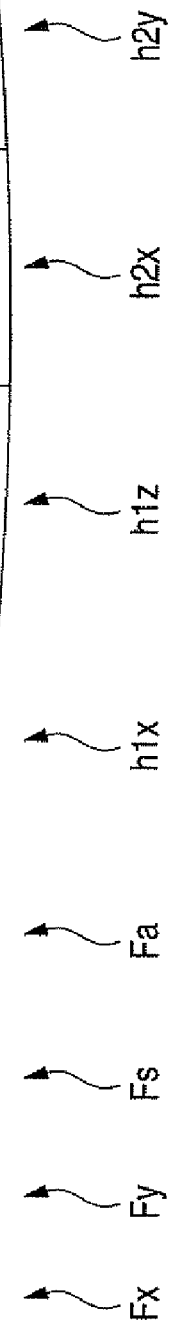
FIG. 6 is an explanatory diagram showing a holding example of face position information and hand position information generated by the action analysis apparatus according to the embodiment of the invention.

Also, the control section 11 performs the following processing with respect to hand position information detected based on each of the frame image data of each of the moving image data. That is, the hand position information is information about two-dimensional coordinate values, respectively, and information about coordinate values of each of the two axes of X and Z axes shown in FIG. 5 is obtained from the first moving image data, and information about coordinate values of each of the two axes of X and Y axes shown in FIG. 5 is obtained from the second moving image data. Incidentally, FIG. 5 shows that the X axis extends from the back to this side on paper. Therefore, in the control section 11, based on each of the moving image data, face position coordinates Fx, Fy (for example, center coordinates of an area recognized that a face exists, and in this case, specified as X and Y coordinates) indicated by face position information, a face size Fs (size of an area recognized that a face exists), a face inclination Fa, an X-axis coordinate H1x and a Z-axis coordinate H1z of hand position information obtained from the first moving image data, and an X-axis coordinate H2x and a Y-axis coordinate H2y of hand position information obtained from the second moving image data are associated with a frame number and are obtained as shown in FIG. 6. The control section 11 stores data of a table shown in this FIG. 6 in the storage section 12.

Then, the control section 11 generates three-dimensional information about the hand position information from this stored table. That is, the control section 11 previously accepts specification of the hand position information indicating the same axis direction among the hand position information H1x, H1z, H2x and H2y from a user. Here, both pieces of the hand position information H1x and H2x is information about the X-axis direction and is information indicating the same axis direction, so that it shall accepts specification that these pieces of the information are common.

The control section 11 targets two pieces of hand position is information specified that they are common for processing, and sets any one of the two pieces of hand position information as reference information, and sets the other as adjustment target information. Here, the hand position information obtained from the first moving image data is set as the reference information. Then, the maximum value and the minimum value are detected with the two pieces of hand position information. That is, both of these pieces of hand position information change with movement of a hand. In the case of doing exercise such as quoits as shown in the example herein, a hand moves backward and forward between an X coordinate value of a position in which the ring is placed and an X coordinate value of a position in which the quoit pole is present, so that a periodic curve with a trigonometric function shape is formed as shown in FIG. 6.

The control section 11 detects the maximum values (H1xmax, H2xmax) and the minimum values (H1xmin, H2xmin) of each of the hand position information, and calculates differences between the maximum values and the minimum values in each of the hand position information. That is, the following differences are calculated.

$$\Delta H1 = H1x\text{max} - H1x\text{min}$$

$$\Delta H2 = H2x\text{max} - H2x\text{min}$$

Then, a ratio between the reference information and the adjustment target information is obtained. Here, the case of setting the hand position information obtained from the first moving image data as the reference information is taken as an example, so that the obtained ratio is as follows.

$$R = \Delta H2 / \Delta H1$$

Then, each of the X-axis coordinates H2x and the Y-axis coordinates H2y of the hand position information obtained from the second moving image data among the data stored in the storage section 12 are multiplied by this ratio R and a value of the second moving image data is corrected. By this correction, a difference between scales of the coordinate values caused by a difference etc. between a hand of a person and each of the cameras can be corrected.

Further, a difference acquired by subtracting the maximum value of the adjustment target information from the maximum value of the reference information among each of the hand position information is obtained.

$$\Delta H = H1x\text{max} - H2x\text{max}$$

Then, this difference $\Delta H$ is added to each of the X-axis coordinates $H2x$ of the hand position information obtained from the second moving image data among the data stored in the storage section 12. As a result of this, a difference (shift) between positions of the coordinate values caused by a difference between arrangement positions etc. of each of the cameras can be corrected. Incidentally, here, a value of the difference of the source of correction of the shift is not obtained from the maximum value, and may be obtained by subtracting the minimum value of the adjustment target information from the minimum value of the reference information.

Also, the maximum value or the minimum value of the hand position information is used herein, but instead of this, various statistical information (for example, an average value of the maximum peak and an average value of the minimum peak) may be used. Also, in correction of the shift, for example, a difference between average values of the hand position information may be used.

[Action Classification]

Figures 7, 8:
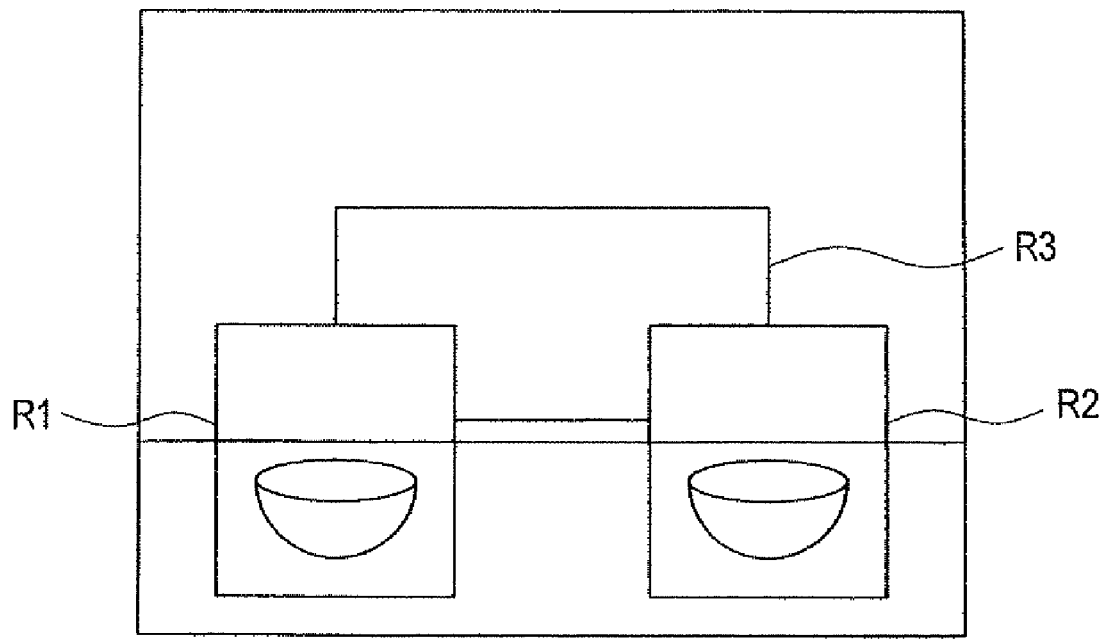
FIG. 7 is an explanatory diagram showing an example of areas of action information set in the action analysis apparatus according to the embodiment of the invention.
FIG. 8 is an explanatory diagram showing an example of information indicating a period of action information about the action analysis apparatus according to the embodiment of the invention.

Further, the control section 11 of the embodiment may generate information (action information) about an action of an imaged person based on a movement state on moving image data of an image area including a predetermined portion of the human body detected in each of the frame image data. For example, an image corresponding to each of the frame image data is divided into plural areas and information indicating the contents of an action is associated with each of the areas obtained by the division (FIG. 7). In an example of FIG. 7, for example, the case that an imaged person repeats work to pick up a pea put into a first box by a hand and move the pea to a second box is assumed. Here, action information about "pick up a pea (pickup)" is associated with an area R1 including the first box. Also, action information about "place a pea (place)" is associated with an area R2 including the second box. Further, action information about "move a pea (movement)" is associated with an area R3 between the first box and the second box.

The control section 11 generates action information indicating an action performed by the imaged person every each of the frame image data depending on which area of the areas divided herein the generated hand position information is included with respect to each of the frame image data, and associates the action information with the corresponding frame number and stores the action information in the storage section 12.

Further, the control section 11 performs the following processing. First, a counter is reset at "1" and action information associated with the first frame number is first acquired with respect to the stored information. Next, the control section 11 scans the stored information in order of the frame numbers, and acquires action information, and compares the action information acquired this time with the action information acquired last time. When the action information acquired this time is equal to the action information acquired last time herein, the counter is incremented by "1" and processing for acquiring action information is repeated with respect to the next frame number.

Also, when the action information acquired this time is different from the action information acquired last time, a value of the counter at that point in time is associated with the action information acquired last time and is stored in the storage section 12. Then, the control section 11 resets the counter at "1" and repeats processing for acquiring action information with respect to the next frame number.

In this manner, data in which the action information is associated with the number of frames in the period when actions indicated by each of the action information are performed is generated (FIG. 8). The control section 11 computes an average value of the number of frames associated every action information. Then, the average value computed every action information is associated with the corresponding action information and is stored in the storage section 12. This average value represents the average (average action time) of times for which the imaged person performs each of the actions. In this case, the number of frames may be converted into a value of time by multiplying the average value by an imaging time interval of each of the frames in moving image data.

Incidentally, here, frames in which a hand is in a predetermined position are identified and time necessary for the imaged person to do work is estimated by the average of intervals of the numbers of the frames identified, but instead of this, for example, a moving distance between coordinates (for example, the center coordinates of an area identified by hand position information) related to hand position information about adjacent frames (between kth frame and (k+1)th frame) may be obtained and time necessary for the imaged person to do work may be estimated by the average of intervals of the numbers of the frames in which the moving distance becomes "0".

Further, a difference between the coordinates related to hand position information about adjacent frames is multiplied by a predetermined conversion parameter and further is divided by the imaging time interval of each of the frames in moving image data and a moving speed of a hand may be obtained. Here, the conversion parameter is a parameter for converting a coordinate value into a distance (for example, a unit of centimeter). In a value of this moving speed, an average moving speed of the hand can be computed by computing an average value over all the frames.

The control section 11 associates the computed information or the hand position information itself with information about the acquired time and date, and stores and records the information in the storage section 12.

For example, in the contents of this record, a name (N) of the imaged person, a date (D), computation values (E) such as the average action time or the average moving speed every each action information, and the hand position information itself (R) are associated as shown in FIG. 9.

Figure 10A:
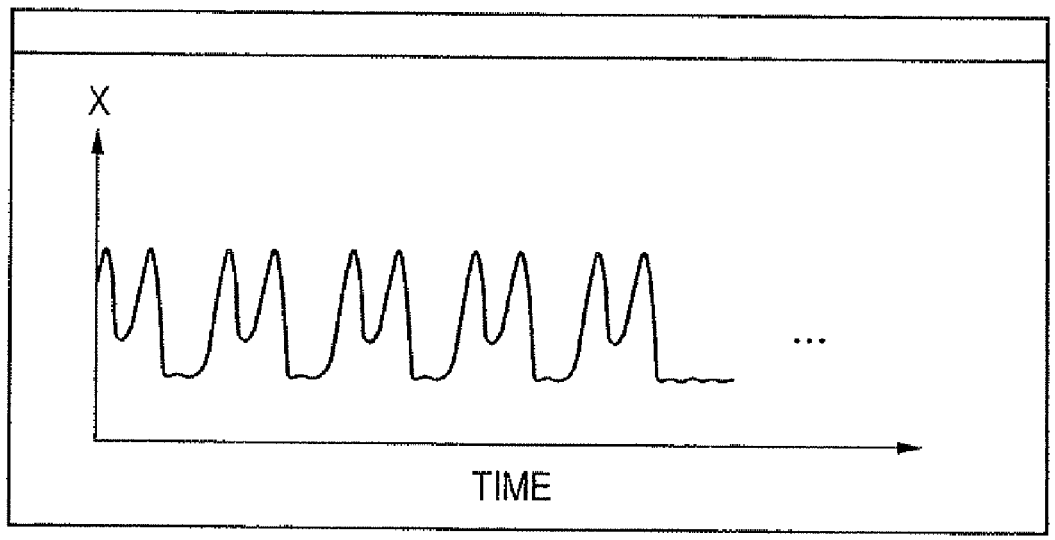
FIGS. 10A and 10B are explanatory diagrams showing a display screen example of action information by the action analysis apparatus according to the embodiment of the invention.
Figure 10B:
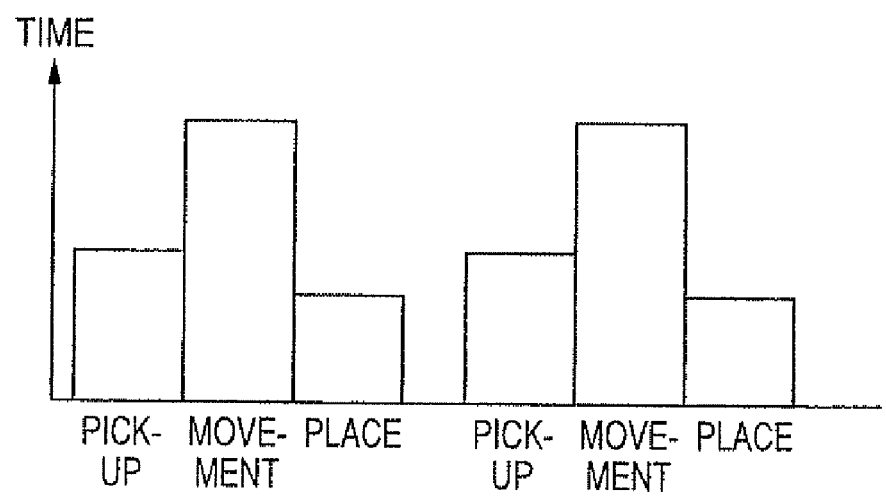

The control section 11 may display and output the information recorded herein to the display section 14 according to instructions from a user. Also, the plural information recorded may be presented comparably. That is, in order to examine an improvement level of an action or a proficiency level of an imaged person to work, the computation values etc. associated with information about different dates may be graphed and be displayed and outputted to the display section 14. As a specific example, in FIGS. 10A and 10B, graphing (FIG. 10A) of the hand position information associated with one date selected as a target of display is displayed together with graphing (FIG. 10E) of the computation values associated with each of the plural dates selected as a target of display.

Here, in the graph of the hand position information, a graph indicating a change in values related to one coordinate of two coordinate values included in the hand position information is displayed and also the computation values are shown by displaying the average action time about each of the action information by a bar graph herein, but these display forms are not limited to the forms shown herein.

[Action of Apparatus]

According to the embodiment, information for identifying a position of a face or a hand are generated from each of the frame image data included in moving image data and further, information for identifying frame image data at a point in time when these information satisfy, for example, a condition that a difference between the information of positions identified in adjacent frame image data is less than a threshold value (a face or a hand does not move) is generated.

Then, the information for identifying frame image data at a point in time of satisfying the condition is supplied to processing of browsing of the moving image data. For example, an image etc. at the time when a face or a hand does not move can be browsed by reproducing a predetermined number of frame image data centered on the frame identified by the information.

Incidentally, when sound is further recorded, information for identifying frame image data at a point in time of satisfying a condition that, for example, an imaged person has raised a voice is generated and using the information for identifying frame image data at a point in time of satisfying the condition, for example, an image at the time when the imaged person has raised the voice can be browsed by reproducing a predetermined number of frame image data centered on the frame identified by the information. Similarly, with respect to information acquired by other sensors, for example, a pulse or a blood pressure as well as the voice, information for identifying frame image data at a point in time of satisfying a condition that, for example, the pulse exceeds a predetermined value may be generated and be supplied to processing of browsing.

According to the embodiment, a point in time to place more emphasis can be visually recognized, and a moving image of a portion in which a feature action is performed can be selectively reproduced and browsed and a burden of a person in charge of an action check can be reduced to improve working efficiency.

The entire disclosure of Japanese Patent Application No. 2005-174411 filed on Jun. 14, 2005 including specification, claims, drawings and abstract is incorporated herein by reference in its entirety.

What is claimed is:

1. An action analysis apparatus comprising:
    an acquiring unit that acquires moving image data including a series of frame image data obtained by imaging a human body and environmental information in a period when the moving image data is imaged;
    a unit that detects at least one image area in which a predetermined portion of the imaged human body is imaged in the frame image data included in the acquired moving image data and generates and stores information to identify the detected image area;
    a unit that (i) generates feature quantity information, (ii) generates information to identify frames of the moving image data imaged at a timing at which the feature quantity information satisfies a predetermined condition, (iii) obtains a length of continuous timings at which a length of the feature quantity information exceeds the predetermined condition based on the generated information, and (iv) stores a first frame of the moving image data and a last frame of the moving image data related to the feature quantity information over the continuous timings as well as both the generated information and the length of the continuous timings as feature time point information, wherein
    the feature time point information is applied to present the moving image data to a user, and
    the feature quantity information indicates a facial expression of the human body, and the predetermined condition is a condition that the facial expression is a wry facial expression; and
    a hand identification processing section that obtains a zero-order moment, a first-order moment and a second-order moment of a likelihood value, wherein
    the hand identification processing section moves a search area based on the obtained zero-order moment, adjusts a size of the search area based on the obtained first-order.

2. The action analysis apparatus as claimed in claim 1, wherein second frame image data of a predetermined time range including the frames identified by the feature time point information is highlighted and presented in processing to present information to identify the detected image area to the user.

3. An action analysis apparatus as claimed in claim 1, further comprising a face identification processing section that converts the moving image data into gray scale data and that identifies a face portion.

4. An action analysis apparatus as claimed in claim 3, further comprising:
    an image conversion section that inputs hue data; and
    a skin color extraction section that fetches a partial image of an area corresponding to the face portion among hue data inputted from the image conversion section, and computes and outputs an average hue data of the partial image.

5. An action analysis method using a computer, the computer performing the following:
    acquiring moving image data including a series of frame image data obtained by imaging a human body and environmental information in the period when the moving image data is imaged;
    detecting at least one image area in which a predetermined portion of the imaged human body is imaged in the frame image data included in the acquired moving image data and generating and storing information to identify the detected image area;
    generating feature quantity information;
    generating information to identify frames of the moving image data imaged at a timing at which the feature quantity information satisfies a predetermined condition;
    obtaining a length of continuous timings at which a length of the feature quantity information exceeds the predetermined condition based on the generated information;
    storing a first frame of the moving image data and a last frame of the moving image data related to the feature quantity information over the continuous timings as well as both the generated information and the length of the continuous timings as feature time point information, wherein
    the feature time point information is applied to present the moving image data to a user, and the feature quantity information indicates a facial expression of the human body, and the predetermined condition is a condition that the facial expression is a wry facial expression; and obtaining a zero-order moment, a first-order moment and a second-order moment of a likelihood value, wherein a search area is moved based on the obtained zero-order moment, a size of the search area is adjusted based on the obtained first-order moment and the search area is rotated based on the obtained second-order moment, wherein at least one of the steps is executed using a processor.

6. A non-transitory computer readable storage medium encoded with a computer program, the storage medium storing the program of instructions executable by the computer to perform a function for analyzing an action, the function comprising:

acquiring moving image data including a series of frame image data obtained by imaging a human body and environmental information in the period when the moving image data is imaged;

detecting at least one image area in which a predetermined portion of the imaged human body is imaged in the frame image data included in the acquired moving image data and generating and storing information to identify the detected image area;

generating feature quantity information;

generating information to identify frames of the moving image data imaged at a timing at which the feature quantity information satisfies a predetermined condition;

obtaining a length of continuous timings at which a length of the feature quantity information exceeds the predetermined condition based on the generated information;

storing a first frame of the moving image data and a last frame of the moving image data related to the feature quantity information over the continuous timings as well as both the generated information and the length of the continuous timings as feature time point information, wherein the feature time point information is applied to present the moving image data to a user, and the feature quantity information indicates a facial expression of the human body, and the predetermined condition is a condition that the facial expression is a wry facial expression; and obtaining a zero-order moment, a first-order moment and a second-order moment of a likelihood value, wherein a search area is moved based on the obtained zero-order moment, a size of the search area is adjusted based on the obtained first-order moment and the search area is rotated based on the obtained second-order moment.

7. An action analysis apparatus comprising:

an acquiring unit that acquires moving image data including a series of pieces of frame image data obtained by imaging a human body;

a first unit that detects at least one image area, in which a predetermined portion of the imaged human body is imaged, in each piece of frame image data included in the acquired moving image data, and generates and stores information to identify the detected image areas;

a second unit that generates plural pieces of feature quantity information each indicating a facial expression of the human body, and generates and stores feature time point information to identify frames of the pieces of frame image data of the moving image data imaged at a timing at which the facial expression indicated by the feature quantity information is a wry facial expression, wherein the feature time point information includes a first frame of the moving image data and a last frame of the moving image data related to the feature quantity information over a length of continuous frame data as well as both information to identify the frame data having the feature quantity information and the length of the continuous frame data having the feature quantity information and is applied to present the moving image data to a user; and a hand identification processing section that obtains a zero-order moment, a first-order moment and a second-order moment of a likelihood value, wherein the hand identification processing section moves a search area based on the obtained zero-order moment, adjusts a size of the search area based on the obtained first-order moment and rotates the search area based on the obtained second-order moment.

* * * * *